United States Patent [19]
Walker, Jr. et al.

[11] Patent Number: 5,872,914
[45] Date of Patent: Feb. 16, 1999

[54] METHOD AND APPARATUS FOR AN ACCOUNT MANAGED OBJECT CLASS MODEL IN A DISTRIBUTED COMPUTING ENVIRONMENT

[75] Inventors: Kenneth Walker, Jr.; Gregory Alan Wilson, both of Austin, Tex.

[73] Assignee: International Business Machines Corporation, Armonk, N.Y.

[21] Appl. No.: 521,855

[22] Filed: Aug. 31, 1995

[51] Int. Cl.$^6$ .................................................. G06F 11/263
[52] U.S. Cl. .......................................... 395/188.01; 707/6
[58] Field of Search .............................. 395/188.01, 609, 395/183.14, 186, 50, 326; 707/6, 103, 104

[56] References Cited

U.S. PATENT DOCUMENTS

| | | |
|---|---|---|
| 4,584,639 | 4/1986 | Hardy . |
| 5,253,297 | 10/1993 | Press . |
| 5,297,279 | 3/1994 | Bannon et al. . |
| 5,369,702 | 11/1994 | Shanton . |

OTHER PUBLICATIONS

*IBM DCE Cross–Platform Guide,* Jun. 16, 1997, pp. 1–2.
*MAP DCE Extended Registry Attributes Report,* Open Software Foundation Research Institute, Zurko, Oct. 1995, pp. 1–4.

OSF DCE Guide to Developing Distributed Applications, Hardold W. Lockhart, Jr., Copyright 1994.

DCE .1. New features, Open Software Foundtation Inc., 2 pgs.

IBM Technical Disclosure Bulletin, vol. 37 No. 08 Aug. 1994, Method for Migrating LAN Area Network Server Accounts to Distributed Computing Robert Environment Registry. pp. 139, 140.

*Primary Examiner*—Robert W. Beausoliel, Jr.
*Assistant Examiner*—Nadeem Iqbal
*Attorney, Agent, or Firm*—David A. Mims, Jr.

[57] ABSTRACT

A method and apparatus for the administration of a user registry in a distributed computing environment (DCE). User administration is achieved by encapsulating the DCE principal, extended registry attributes, and account entities into a single object called an account object. The single account object is a subclass of an abstract object called the registry object, which in turn is a subclass of the DCE extended registry attribute object. The invention provides a single object to which requests are made, thus providing a simplified user interface for accessing the contents of the object-oriented account object.

9 Claims, 4 Drawing Sheets

METHOD AND APPARATUS FOR AN ACCOUNT MANAGED OBJECT CLASS MODEL IN A DISTRIBUTED COMPUTING ENVIRONMENT

FIELD OF THE INVENTION

The present invention relates to data processing systems, and more particularly, to an object-oriented implementation of a set of cooperative and integrated services to enable the secure and reliable use of a network of heterogeneous systems.

BACKGROUND OF THE INVENTION

The development of application and system software for data processing systems has traditionally been a time consuming task. The field of software engineering has attempted to overcome the limitations of traditional techniques by proposing new, more efficient software development models. Object oriented programming has emerged as a promising technology that will allow rapid development, implementation and customization of objects. Each new object has certain data attributes and processes or methods that operate on that data. Data is said to be "encapsulated" by an object, and can only be modified by the object methods, invoked by sending a message to an object identifying the method supplying any needed arguments.

Object oriented systems have two important properties in addition to encapsulation. "Inheritance" is the ability to derive a new object from an existing object and inherit all properties, including methods and data structure, from the existing object. The new object may have certain unique features which are supplied as overrides or modifications to the existing class. For example, a new subclass needs to specify only the functions and data that distinguish that class from the existing more general class.

The ability to override an existing method description enables polymorphism, the ability to have a single message received by an object be processed in different ways depending on the object itself. Inheritance and polymorphism create a powerful structure for implementing new software systems. The software developers does not have to develop each piece of a system, they need only specify the unique features of the system. One object oriented programming system is the System Object Model (SOM). More information on SOM can be found in the SOM objects Developer Toolkit User's Guide, Version 2.0, 1993, available from the International Business Machine Corporation.

In today's computer software environment, code is developed using a modular approach whenever possible. Future software environments will continue to use a modular approach, yielding the concept of reusable software components. This reusability spans many competing layers starting with the operating system, moving up through network transports, distributed computing layers, and finally into application components like spell checkers, search engines, and databases.

In the Distributed Computing Environment (DCE), various software components may be located on more than one physical system, such as a number of computers in a distributed data processing system. Examples of such services include security, directory, and time services. The various components use each other's services by making internal calls to one another (in the form of messages sent from one object to another object) as a way of satisfying a request for a particular service. For example, when an application invokes a security component requesting the addition of a new user to the security registry database, the message requesting an addition of a new user results in other messages being made to other parts of the security component to check that the component making this request is authorized to add users in the databases, which in turn uses a remote procedure call (RPC) component to transmit those requests to the appropriate service.

Such modular software component environments provide programmers with clean, well-defined interfaces for requesting services needed by an application. A problem exist, however, when a system administrator must preform user administration procedures to enable a user to logon or access resources within the distributed computing environment (DCE). The problem emanates from the fact that in the distributed computing environment, the concept of a user of network resources is exposed at a low-level which is not familiar to the system administrators. While mechanisms exist within the DCE environment for creating and manipulating the low-level components of a DCE user, there is not a set of high-level standard administrative and system management definitions.

It is desirable to have an improved method and apparatus for a distributed computing environment, where a set of standard administrative and system management objects are provided, which are readily customizable and easily extendable to satisfy future requirements.

SUMMARY OF THE INVENTION

This invention provides a method and apparatus for the administration of a user registry in a distributed computing environment (DCE). A simplified DCE administrative model is provided via object-oriented techniques. Simplified user administration is achieved by encapsulating the DCE principal, account, and extended registry attributes entities into a single object called an account object. The account object provides all the functions of the principal, account, and extended registry attribute entities including password generation, password enablement and activation. The single account object is a subclass of an abstract object called the registry object, which in turn is a subclass of the DCE extended registry attribute object. The invention provides a single object to which requests are made, thus providing a simplified programming and administrative interface for accessing the contents of the object-oriented account object.

DETAILED DESCRIPTION OF THE EMBODIMENTS

Figure 1:
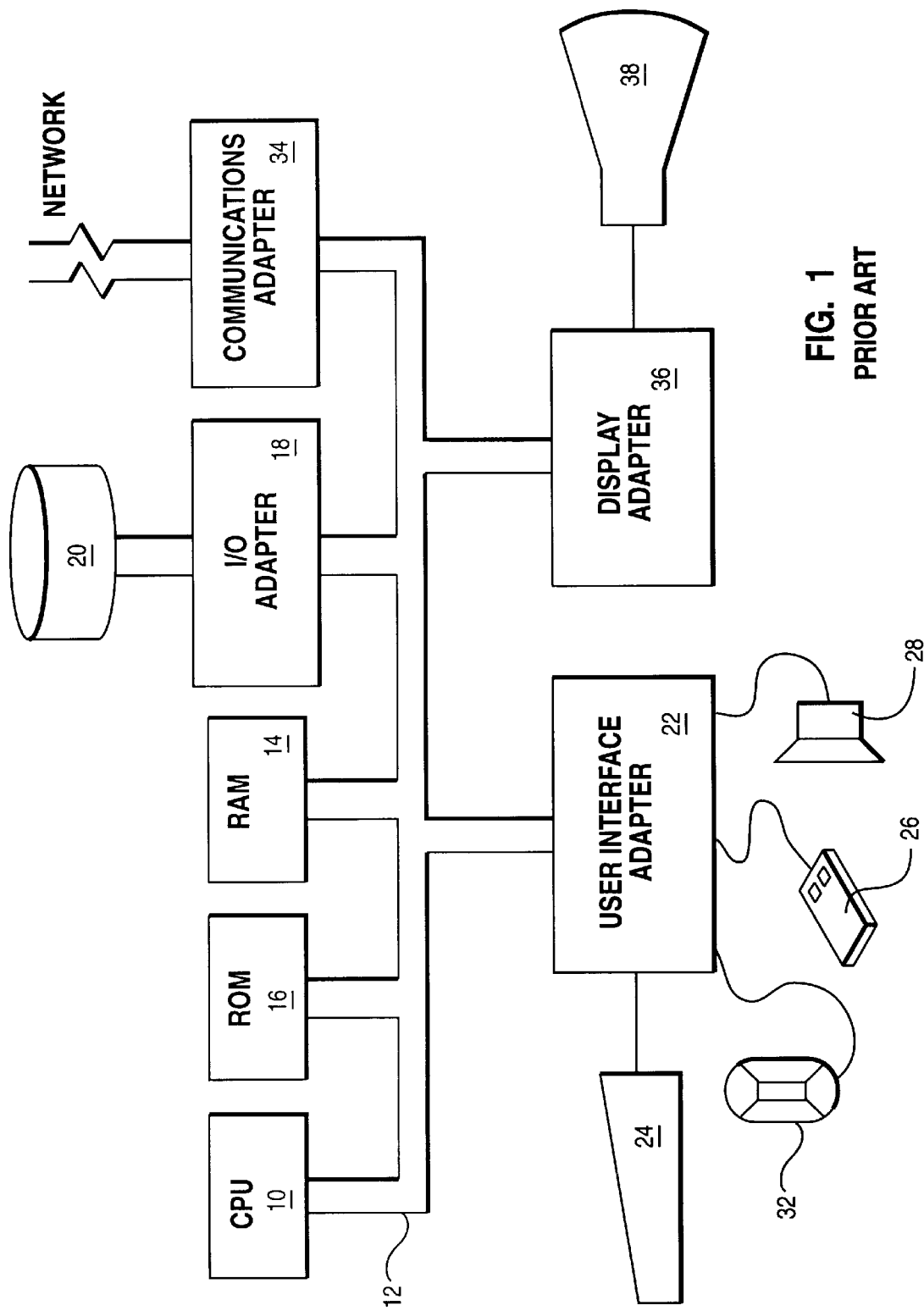
FIG. 1 is a diagram of a workstation in a distributed computing environment (DCE) network where this invention may be practiced.

This invention provides a method and apparatus for creating a common set of managed object definitions which provide a consistent administrative/management interface definitions across heterogeneous distributed computing platforms. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk unit 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network to create a distributed computing environment (DCE) and a display adapter 36 for connecting the bus to a display device 38. The workstation has resident thereon an operating system such as the OS/2 operating system, and the computer software making up this invention.

Figure 2:
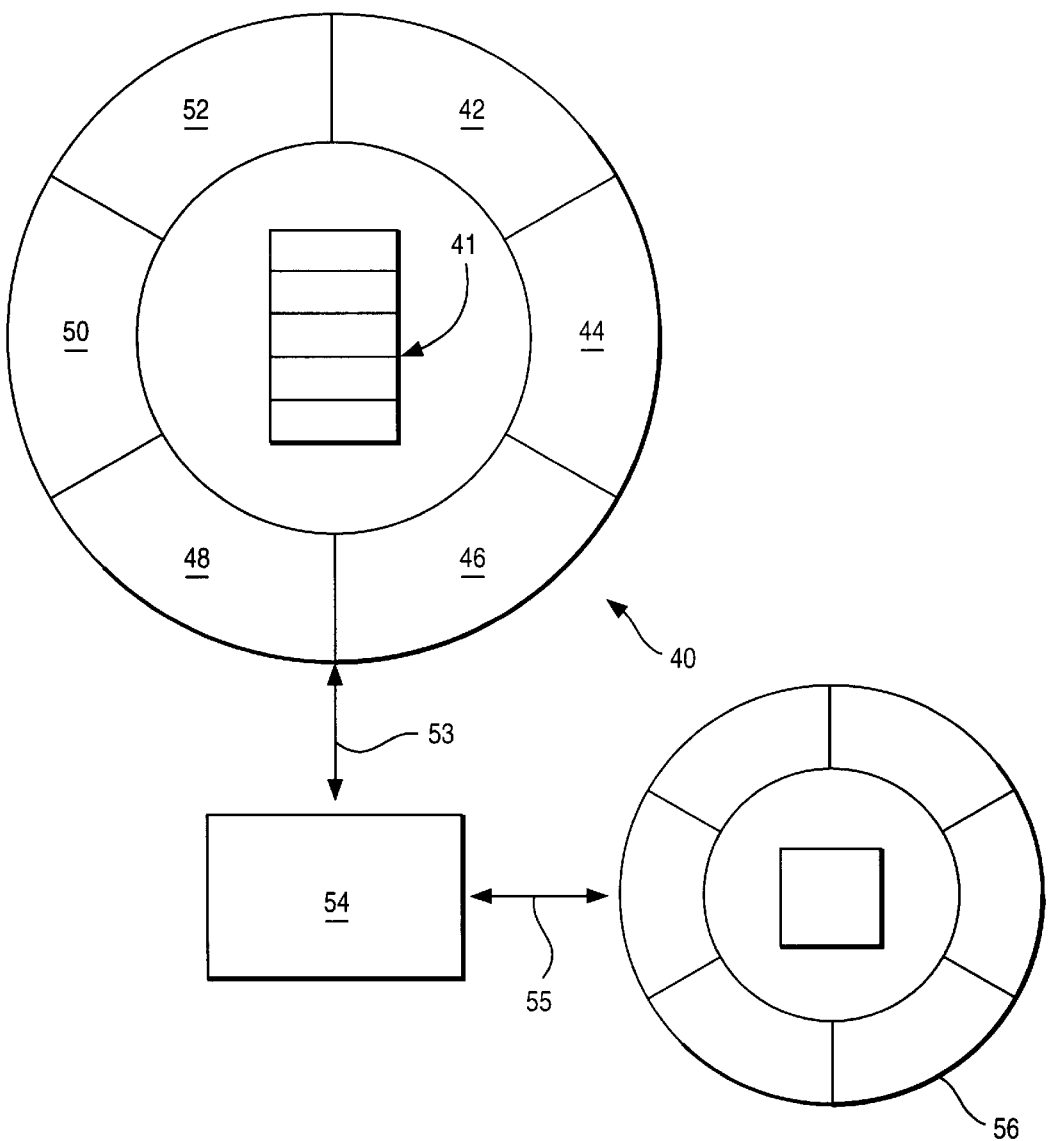
FIG. 2 is a diagram of objects in an object oriented system as used in this invention.

With reference to FIG. 2, a diagram of objects in an object oriented system is depicted in accordance with a preferred embodiment of the present invention. An object encapsulates data and the methods needed to operate on that data. Objects can be represented by a "doughnut diagram" such as shown in FIG. 2. Object data is shown in the center 41 surrounded by the applicable methods 42 to 52. Data 41 may be modified only by the methods of that object. Methods 42–52 are invoked by receiving messages from other objects. A typical object oriented system will have a message router 54 that routes messages between objects. Thus, object 56 causes Method 46 to be invoked by sending a message 55 to message router 54 that in turn sends message 53 to Method 46 of object 40.

Objects are grouped into classes of related objects. The class description contains information relevant to all objects in a class, including a description of instance variable maintained by each of the objects and the available object methods. An object instance is created (or "instantiated") based on that information and has the properties defined in the object class. For example, the object class DOG can include the instance variables "dog_type" and "dog_name" and a "bark" method implementing the response to a bark message. An instance of dog, e.g., Rover, will maintain the type and name instance variables for itself and will respond to the bark message.

Abstract classes are used to describe the interfaces and methods expected to be used by a class without providing detail on the implementation of those methods. Abstract classes are useful where the implementation details are to be left to the implementor. Concrete classes are created as subclasses of abstract classes and implement those classes.

Figure 3:
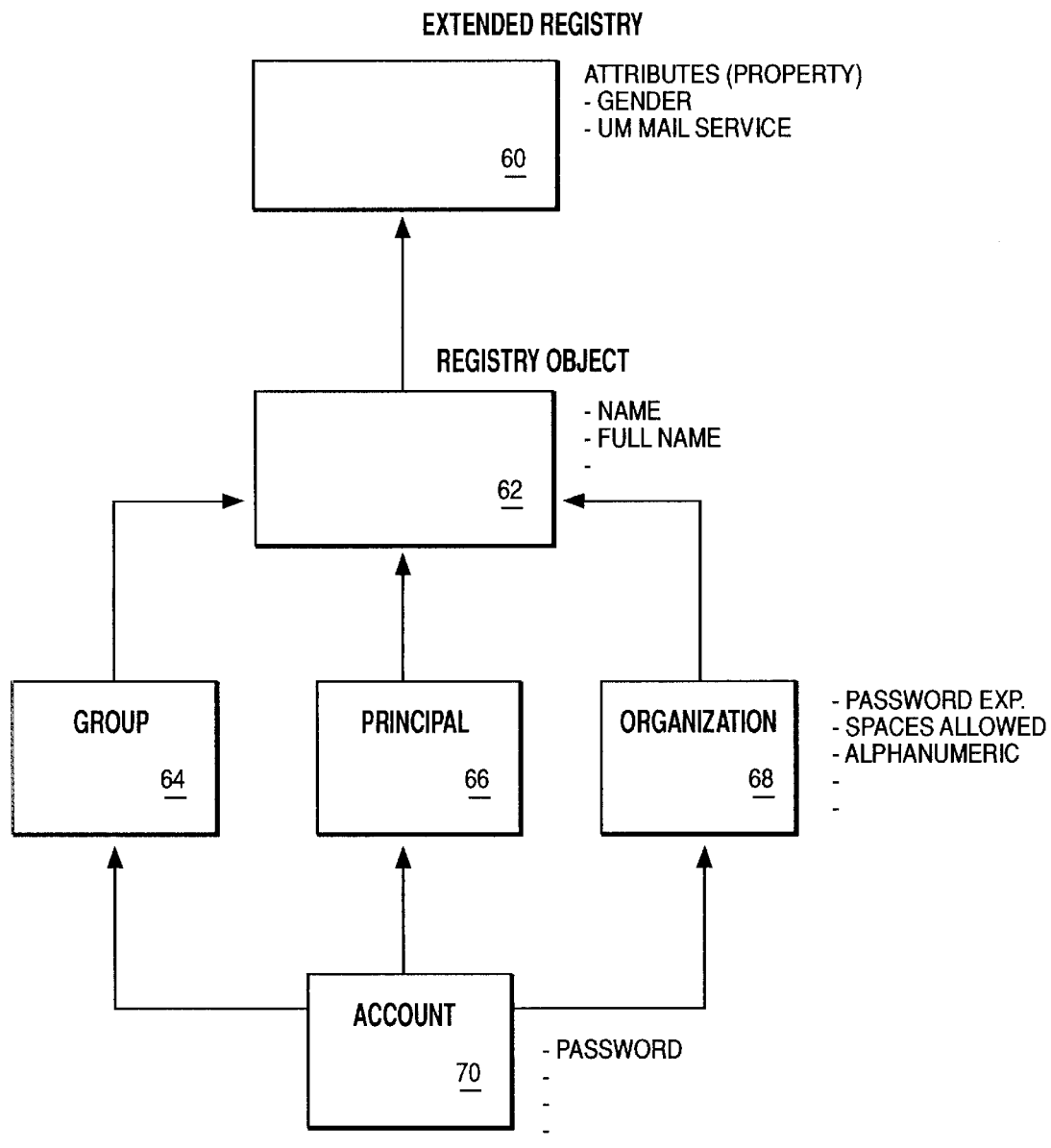
FIG. 3 is a block diagram of the distributed computing environment of this invention.

Turning now to FIG. 3, a block diagram of the essential components required for user administration in a distributed computing environment (DCE) is shown. The extended registry attributes 60 (ERA) entity, contains the dynamic (non-fixed) attributes/properties for the user definition. The ERA 60 entity is the repository for items related to individual users of the network. The ERA 60, for example, may contain such items as the gender of the user or the unique public mail address for the user. The ERA 60 may be accessed by the registry entity 62, which stores additional static (fixed) information on the registered users in a DCE. The registry entity 62, contains information on the users within the DCE, such as the name of the user, nicknames, preferred name, etc. There are three kinds of registry entities in the DCE. The group component 64 contains information about users in a particular group within the DCE. For example, the group component 64 may define a group of users within a financial department or an engineering department. The principal component 66 contains information about users in the DCE. The organization component 68 contains information that will be applied to all users within a particular organization. For example, the organization component 68, may contain a password expiration date (e.g., 30 days, 60 days), whether spaces will be allowed or alphanumeric characters will be allowed in a user's password. Finally the account entity 70, contains the unique password for a user and association to one group component 64 and organization component 68. The account entity 70, accesses the principal 66, group 64, and organization 68 components to determine what resources may be accessed, how the password should be constructed, and the duration of the password. Additional details of the DCE entities illustrated in FIG. 3 may be found in the OSF DCE 1.1 Administration Guide, which is incorporated herein by reference.

Figure 4:
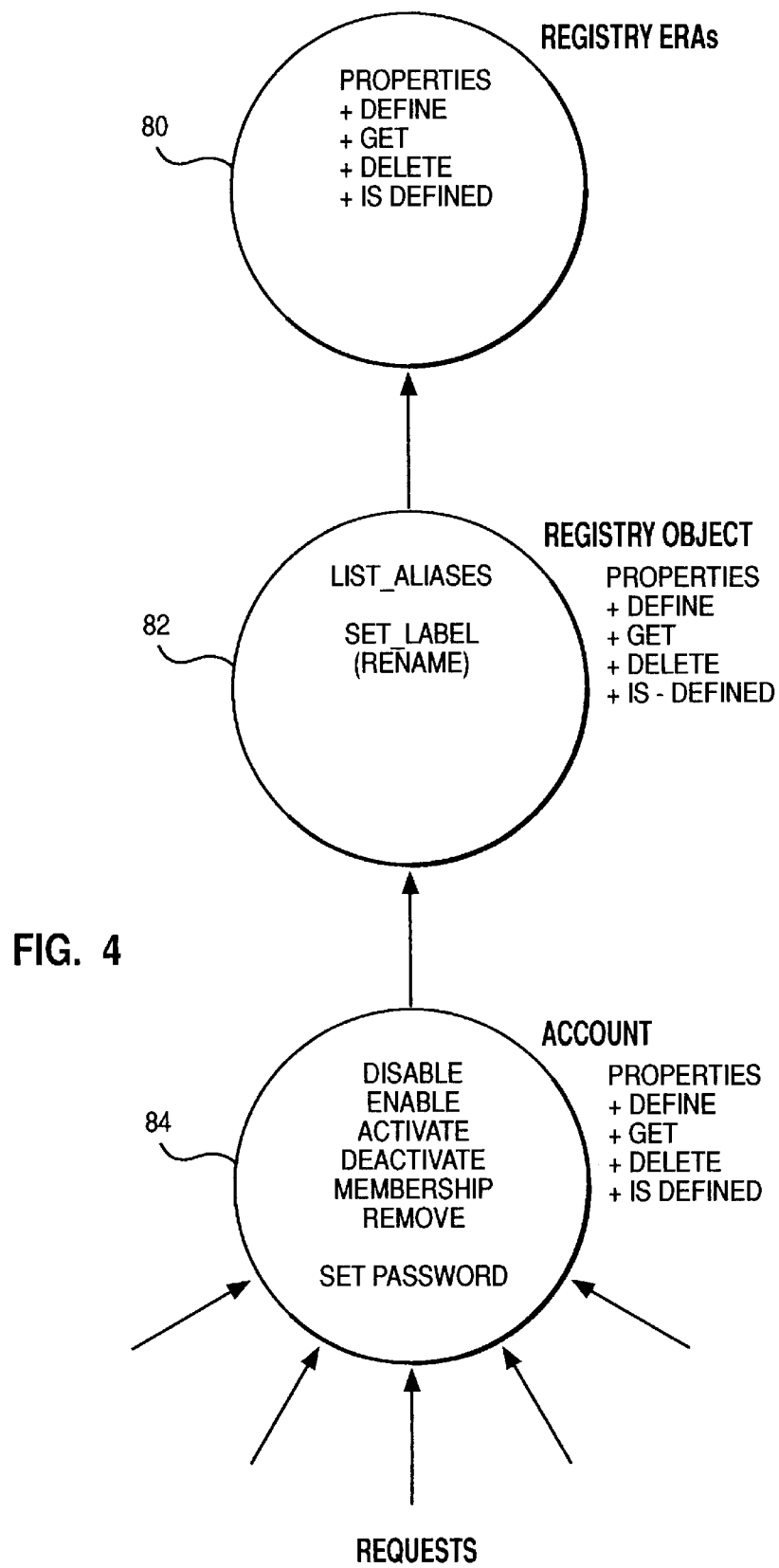
FIG. 4 is a diagram of the object oriented encapsulation of the principal and account entities into a single account object as used in this invention.

Turning now to FIG. 4, the object oriented abstraction of the user administration procedure is shown. The extended registry attribute class 80 is the first component of the object oriented user administration procedure, and is equivalent to the ERA 60 of FIG. 3. The extended registry attribute class 80 has a registry object 82, as a subclass. The registry object class 82, in turn, has a subclass which is an account class 84. The account class 84 represents the combined DCE extended registry attributes/principal/account entities. The methods of the account class 84, the registry object 82, and the extended registry object 80 classes it inherits from is shown in greater detail in TABLE A.

TABLE A

DCE ACCOUNT OBJECT MODEL METHODS

- CREATE OBJECT ('STATE' = INACTIVE, ENABLED, OR DISABLED)
- DEACTIVATE
- ACTIVATE ('STATE' = ENABLED, OR DISABLED)
- ADD_MEMBERSHIP
- SET_MEMBERSHIP
- REMOVE_MEMBERSHIP
- CHECK_MEMBERSHIP
- LIST_MEMBERSHIP
- LIST_ALIASES
- GET_PROPERTY/GET_PROPERTIES
   GET_ALL PROPERTIES / GET_LABEL
- GET_NUMBER_OF_PROPERTIES
- IS_PROPERTY_DEFINED
- DEFINE_PROPERTY / DEFINE_PROPERTIES
- DELETE_PROPERTY / DELETE_PROPERTIES / DELETE_ALL_PROPERTIES
- SET_LABEL (RENAME)
- SET_PASSWORD
- RANDOMIZE_PASSWORD
- REMOVE

While the invention has been described with respect to a preferred embodiment thereof, it will be understood by those skilled in the art that various changes in detail may be made therein without departing form the spirit, scope, and teaching of the invention. Accordingly, the herein disclosed invention is to be limited only as specified in the following claims.

What we claim is:

1. A method, implemented in a data processing system, for managing user administration for a distributed computing environment, comprising:

creating an extended registry attribute class as an abstract object in said distributed computing environment having a registry object class as a subclass;

creating an object oriented account class as a subclass of said registry object in said distributed computing environment having at least one password; and generating a user request from an owner of said at least one password to access resources on said distributed computing environment; and granting access to said resources on said distributed computing environment using said object oriented account class.

2. The method of claim 1 wherein said creating step further comprises:

creating said object-oriented registry object in said distributed computing environment having at least one name of said user in said distributed computing environment.

3. The method of claim 1 wherein said creating step further comprises:

creating said object-oriented extended registry attribute class in said distributed computing environment having at least one property of said user in said distributed computing environment.

4. An apparatus for managing user administration for a distributed computing environment, comprising:

means for creating an extended registry attribute class as an abstract object in said distributed computing environment having a registry object class as a subclass;

means for creating an object oriented account class as a subclass of said registry object in said distributed computing environment having at least one password; and means for generating a user request from an owner of said at least one password to access resources on said distributed computing environment; and means for granting access to said resources on said distributed computing environment using said object oriented account class.

5. The apparatus of claim 4 wherein said means for creating further comprises:

means for creating said object-oriented registry object in said distributed computing environment having at least one name of said user in said distributed computing environment.

6. The apparatus of claim 4 wherein the means for creating further comprises:

means for creating said object-oriented extended registry attribute class in said distributed computing environment having at least one property of said user in said distributed computing environment.

7. A computer program product having a computer readable medium having computer program logic recorded thereon for managing user administration for a distributed computing environment, comprising:

computer readable program code means for creating an extended registry attribute class as an abstract object in said distributed computing environment having a registry object class as a subclass;

computer readable program code means for creating an object oriented account class as a subclass of said registry object in said distributed computing environment having at least one password; and computer readable program code means for generating a user request from an owner of said at least one password to access resources on said distributed computing environment; and computer readable program code means for granting access to said resources on said distributed computing environment using said object oriented account class.

8. The computer readable program of claim 7 wherein said computer readable program code means for creating further comprises:

computer readable program means for creating said object-oriented registry object in said distributed computing environment having at least one name of said user in said distributed computing environment.

9. The computer readable program of claim 8 wherein said computer readable program code means for creating further comprises:

computer readable program code means for creating said object-oriented extended registry attribute class in said distributed computing environment having at least one property of said user in said distributed computing environment.

\* \* \* \* \*